United States Patent
Dhayni

(10) Patent No.: US 9,632,896 B2
(45) Date of Patent: Apr. 25, 2017

(54) BUILT-IN SELF-TESTING METHOD OF A NEAR FIELD COMMUNICATION DEVICE

(71) Applicant: Optis Circuit Technology, LLC, Plano, TX (US)

(72) Inventor: Achraf Dhayni, Vallauris (FR)

(73) Assignee: Optis Circuit Technology, LLC, Plano, TX (US)

( * ) Notice: Subject to any disclaimer, the term of this patent is extended or adjusted under 35 U.S.C. 154(b) by 123 days.

(21) Appl. No.: 14/273,650

(22) Filed: May 9, 2014

(65) Prior Publication Data

US 2014/0349586 A1    Nov. 27, 2014

(30) Foreign Application Priority Data

May 22, 2013 (EP) ..................... 13305656

(51) Int. Cl.
| | |
|---|---|
| H04B 17/00 | (2015.01) |
| G06F 11/27 | (2006.01) |
| H04B 5/00 | (2006.01) |
| H04B 17/17 | (2015.01) |
| H04B 17/19 | (2015.01) |

(52) U.S. Cl.
CPC ............ G06F 11/27 (2013.01); H04B 5/0062 (2013.01); H04B 17/00 (2013.01); H04B 17/17 (2015.01); H04B 17/19 (2015.01)

(58) Field of Classification Search
CPC ......... G06F 11/27; H04B 17/00; H04B 17/17; H04B 17/19; H04B 5/0062
USPC ............................................. 455/67.11, 67.14
See application file for complete search history.

(56) References Cited

U.S. PATENT DOCUMENTS

| | | | |
|---|---|---|---|
| 2009/0046773 A1* | 2/2009 | Scherr .................. | H04L 5/1484 375/238 |
| 2010/0049465 A1* | 2/2010 | Pineda De Gyvez ............... | H04B 17/0085 702/122 |
| 2010/0259367 A1* | 10/2010 | Kung ................... | G06K 7/0095 340/10.3 |
| 2011/0218755 A1* | 9/2011 | Dhayni ............ | G01R 31/31716 702/117 |
| 2011/0267086 A1* | 11/2011 | Pagani ............... | G01R 31/2884 324/754.21 |
| 2012/0191400 A1* | 7/2012 | Sontakke ......... | G01R 31/31917 702/119 |

* cited by examiner

*Primary Examiner* — Xin Jia
(74) *Attorney, Agent, or Firm* — Spencer C. Patterson; Grable Martin Fulton PLLC

(57) ABSTRACT

A built-in self-testing method of a near field communication device including several functions tests a first internal communication link between a first function and a second function. The testing is performed by sending, on said first internal communication link, a first command from said first function used as a transmitter to said second function used as a receiver, and by checking said first command has been correctly executed by said second function.

14 Claims, 4 Drawing Sheets

BUILT-IN SELF-TESTING METHOD OF A NEAR FIELD COMMUNICATION DEVICE

RELATED APPLICATIONS

This claims priority and benefit from European Application No. 13305656.4, filed May 22, 2013, the entire teachings of which are incorporated herein by reference.

TECHNICAL FIELD

The invention relates to built-in self-testing methods of a near field communication device, to near field communication devices using such a built-in self-testing method, and to arrangement for near field communication devices using such a built-in self-testing method.

BACKGROUND

According to a first prior art, it is known testing and validation of near field communication devices at different time points during their manufacturing process and afterwards during their use life. But this testing and validation of near field communication devices needs external equipment like an expensive radio frequency tester and or some other validation equipment, among which external coils, robots, network analyzers, and or radio frequency connectors. A drawback of this first prior art is to be rather complex and expensive.

SUMMARY

An object of embodiments of the present invention is to alleviate at least partly the above mentioned drawbacks.

The testing and validation problem could be tackled by using some built-in self-testing methods known in other fields than near field communication, by implementing some dedicated components in the near field communication device in order to perform such built-in self-testing method, like implementing some generators of binary sequences as stimulus signal. Some loopbacks would be implemented in order to send the stimulus signal and to analyze which response comes back. However, the test coverage of this built-in self-testing method would not be that large and some substantial silicon overhead would be needed.

Therefore, embodiments of the invention contemplate providing for a built-in self-testing method which would present large test coverage and which would preferably need no or little silicon overhead. Therefore, instead of using simple loopback with signal transmission and reception, embodiments of the invention preferably contemplate testing an internal communication link of the near field communication device, sending a command and analyzing the result of this command sending, checking whether the sent command has been correctly executed or not.

When embodiments of the invention aim to send a command on a communication link and check whether this command has been correctly executed or not, the results of the test are as follows. If the command has been correctly executed, then the tested link is considered to pass the test and the corresponding components or functions are considered to be validated. If the command has not been correctly executed, then the tested link is considered to fail the test and the corresponding components or functions are considered to be not validated, which means they are considered to be defective.

The fact of using a communication link and of sending a command on this communication link, rather than simply sending a signal between two blocks of the near field communication device, provides for higher test coverage. Besides, since making a throughout use of existing components of the near field communication device, what is easier because of using communication link and sending command as in or in conditions very similar to normal use conditions of the near field communication device, there will be needed no or very little silicon overhead to perform the built-in self-testing method. That way, the real functionality of the different components or functions of the near field communication device is tested by the built-in self-testing method. Hence the reliability of the built-in self-testing method is improved.

Moreover, preferred embodiments of the invention provide for a digital modem in the near field communication device undergoing state transitions as a result of the command sending over the tested link. That way, the digital modem is tested too, and not only its internal structure, what could also be done quite easily by other known tests, but also the interface between digital modem and near field communication analog frontend, which interface is indeed both difficult to test and important to be tested.

Moreover, preferred embodiments of the invention provide for scenarios testing at least two internal communication links within the near field communication device. That way, the more important functionalities of the near field communication device are all tested by performing the built-in self-testing method, increasing test coverage all the more.

Embodiments of the invention provide for both a built-in self-testing method and a near field communication device implementing such a built-in self-testing method, as well as for an arrangement for a near field communication device implementing such a built-in self-testing method. An arrangement for a near field communication device may contain only part of the usual components of a near field communication device.

This object and other objects may be achieved with a built-in self-testing method of a near field communication device including several functions, comprising testing a first internal communication link between a first function and a second function, by sending, on said first internal communication link, a first command from said first function used as a transmitter to said second function used as a receiver, and by checking said first command has been correctly executed by said second function.

This object and other objects may also be achieved with an arrangement for a near field communication device including several blocks and a built-in self-testing system adapted to test a first internal communication link between a first block and a second block, by sending, on said first internal communication link, a first command from said first block used as a transmitter to said second block used as a receiver, and by checking said first command has been correctly executed by said second block.

Preferably, first, second and or third commands are predetermined commands, in the meaning that the commands are known in advance, for example wake up or demodulate. The type of signal to demodulate may not be known in advance.

According to another object of the invention, the built-in self-testing method tests an internal link of an arrangement for a near field communication device by simultaneously activating the reader transmitter, the tag emulator and the reader receiver, of the arrangement for the near field communication device.

Preferred embodiments comprise one or more of the following features:

- the built-in self-testing method also comprising testing a second internal communication link between said second function and a third function, by sending, on said second internal communication link, a second command from said second function used as a transmitter to said third function used as a receiver, and by checking said second command has been correctly executed by said third function.
- the built-in self-testing method also comprising testing a third internal communication link between said first function and said third function, by sending, on said third internal communication link, a third command from said first function used as a transmitter to said third function used as a receiver, and by checking said third command has been correctly executed by said third function.
- said near field communication device includes a digital modem which can undergo state transitions, either from transmitting state to receiving state or from receiving state to transmitting state, wherein said command correct execution results in said digital modem undergoing one or more expected transitions, and wherein said checking checks whether said digital modem has undergone said expected transition(s) or not.
- said first and or second command is or are initiated by said digital modem and checked at said digital modem.
- said first function is a reader transmitter block or antenna driver block and wherein said second function is a tag emulator block.
- said second function is a tag emulator block and wherein said third function is a reader receiver block.
- said first command is a wake up command and or wherein said second command is a demodulation command of amplitude modulated carrier.
- it is performed with and or without an antenna connected to the inputs of said functions.
- a computer program product comprising a computer readable medium, having thereon a computer program comprising program instructions, the computer program being loadable into a data-processing unit and adapted to cause execution of the method according to any of preceding claims when the computer program is run by the data-processing unit.
- said built-in self-testing system is also adapted to test a second internal communication link between said second block and a third block, by sending, on said second internal communication link, a second command from said second block used as a transmitter to said third block used as a receiver, and by checking said second command has been correctly executed by said third block.
- the arrangement for a near field communication device further including a digital modem which can undergo state transitions, either from transmitting state to receiving state or from receiving state to transmitting state, wherein said command correct execution results in said digital modem undergoing one or more expected transitions, and wherein said checking checks whether said digital modem has undergone said expected transition(s) or not.
- said first block is a reader transmitter or an antenna driver, wherein said second block is a tag emulator, and wherein said third block is a reader receiver.
- said built-in self-testing system also includes an additional resistance adapted to emulate the load of an antenna when no antenna is connected during performance of internal communication link testing.

Preferably, all tested functions share two input pins on which an antenna is to be connected. This sharing of inputs makes the testing of the internal link(s) all the easier, since to specific connection should be implemented between functions or blocks of the arrangement for a near field communication device.

Preferably, built-in self-testing method is performed during manufacturing of an arrangement for a near field communication device, before and or after packaging of said arrangement. Advantageously, built-in self-testing method is performed during manufacturing of an arrangement for a near field communication device, before an antenna is connected to said arrangement. Advantageously, built-in self-testing method is performed during manufacturing of an arrangement for a near field communication device, after an antenna is connected to said arrangement.

Preferably, built-in self-testing method is performed during utilization of a near field communication device by a user. Preferably, built-in self-testing method is performed at each startup, especially if near field communication device performs payment transaction.

Preferably, total duration of built-in self-testing method is less than 100 ms. Built-in self-testing method is indeed so quick that it is even not noticed by the user of the near field communication device.

Preferably, the near field communication device is included in a mobile phone. Preferably, the invention also contemplates a near field communication device adapted to perform the telecommunication functionalities of a mobile phone.

According to some embodiments of the invention, there is a user equipment comprising an arrangement for a user equipment according to some embodiments of the invention.

Further features and advantages of the invention will appear from the following description of embodiments of the invention, given as non-limiting examples, with reference to the accompanying drawings listed hereunder.

DETAILED DESCRIPTION OF THE INVENTION

Figure 1:
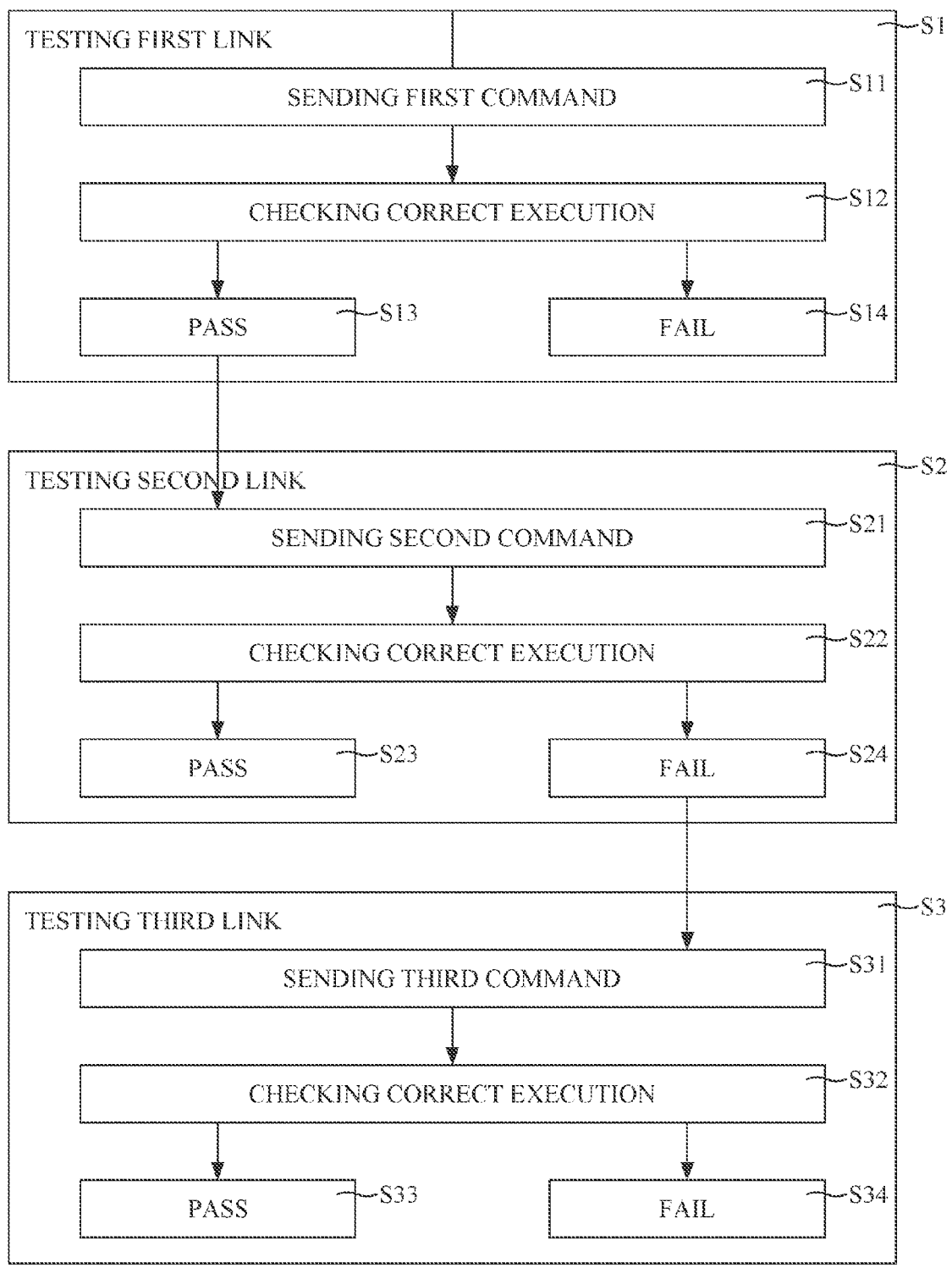
FIG. 1 shows an example of performing the steps of the built-in self-testing method of a near field communication device according to embodiments of the invention.

FIG. 1 shows an example of performing the steps of the built-in self-testing method of a near field communication device according to embodiments of the invention. The near field communication device includes several functions. Three communication links may be successively tested in step S1 for the first communication link, in step S2 for the second communication link, in step S3 for the third communication link.

In step S1 testing the first communication link between a first function and a second function, there are sub-steps S11 of sending first command, S12 of checking correct execution, S13 of passing the test, S14 of failing the test. First, in sub-step S11 of sending first command, a first command is sent from the first function used as a transmitter to the second function used as a receiver. Then, in sub-step S12 of checking correct execution, it is checked whether the first command has been correctly executed by the second function or not. If there has been a correct execution, then the test is considered as been passed in sub-step S13 of passing the test. Then, the testing method goes to sub-step S21 of step S2. If on the contrary, there has not been a correct execution, which means there has been an incorrect execution or no execution at all, then the test is considered as been failed in sub-step S14 of failing the test. Then the testing method stops and the circuit is considered as defective.

In step S2 testing the second communication link between said second function and a third function, there are sub-steps S21 of sending first command, S22 of checking correct execution, S23 of passing the test, S24 of failing the test. First, in sub-step S21 of sending second command, a second command is sent from the second function used as a transmitter to the third function used as a receiver. Then, in sub-step S22 of checking correct execution, it is checked whether the second command has been correctly executed by the third function or not. If there has been a correct execution, then the test is considered as been passed in sub-step S23 of passing the test. Then the testing method stops and the circuit is considered as good and fit. If on the contrary, there has not been a correct execution, which means there has been an incorrect execution or no execution at all, then the test is considered as been failed in sub-step S14 of failing the test. Then, the testing method goes to sub-step S31 of step S3 in order to perform a diagnostic to know more precisely where in the circuit there has been a failure and which component of the circuit happens to be defective.

In step S3 testing the third communication link between said first function and said third function, there are sub-steps S31 of sending first command, S32 of checking correct execution, S33 of passing the test, S34 of failing the test. First, in sub-step S31 of sending first command, a third command is sent from the first function used as a transmitter to the third function used as a receiver. Then, in sub-step S32 of checking correct execution, it is checked whether the third command has been correctly executed by the third function or not. If there has been a correct execution, then the test is considered as been passed in sub-step S33 of passing the test. Then, the testing method stops and it can be deduced that the third function is good and fit, hence that the second function is defective. If on the contrary, there has not been a correct execution, which means there has been an incorrect execution or no execution at all, then the test is considered as been failed in sub-step S34 of failing the test. Then the testing method stops and the third function is considered as defective. It can be deduced that the second function is probably good and fit.

Figure 2:
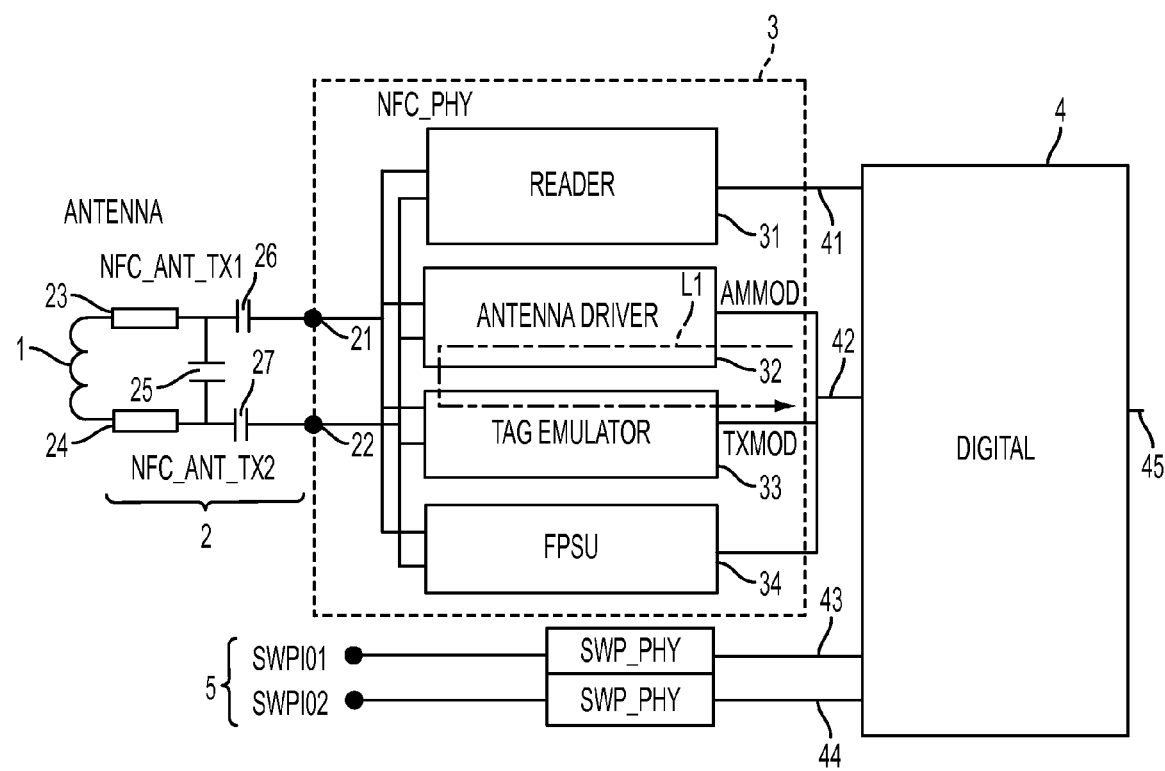
FIG. 2 shows an example of performing the test step of the built-in self-testing method, for a first internal communication link in a near field communication device according to embodiments of the invention.

FIG. 2 shows an example of performing the test step of the built-in self-testing method, for a first internal communication link in a near field communication device according to embodiments of the invention. The near field communication device, when its manufacturing has been completed and when it is ready for use, will comprise several layers and several components. There are the near field communication antenna 1, more simply called antenna 1, the antenna matching network 2, more simply called matching network 2, the near field communication analog front end 3, more simply called analog front end 3, the near field communication digital modem 4, more simply called digital modem 4, and the security interface 5, which are successively connected to one another.

The antenna 1 is sending near field communication signal to and receiving near field communication signal from another external near field communication device. The matching network 2 comprises two pins 21 and 22 to be connected to the analog front end 3. It comprises also two branches respectively including two resistances 23 and 24 in parallel as well as two capacitors 26 and 27 in parallel. A capacitor 25 is in between the two branches linking the two nodes between resistance and capacitor. Both antenna 1 and matching circuit 2 are mounted off-chip on the PCB (printed circuit board) where the near field communication chip is mounted. Antenna 1 and matching circuit 2 are connected to the near field communication chip via the pins 21 called NFC_ANT_TX1 and 22 called NFC_ANT_TX2. The built-in self-testing method according to embodiments of the invention can be performed with or without antenna 1 and matching circuit 2 being connected to the near field communication chip.

The analog front end 3 comprises several functions or blocks, among which, a reader receiver 31, a reader transmitter 32 also called antenna driver 32, a tag emulator 33, and a field power supply unit 34 which is used to supply power to the whole electronic circuit. Function or block will be used indifferently in the text, even if function illustrates more the functionality and block more the structure of an element. All these functions or blocks have two inputs/outputs respectively connected to pins 21 and 22. The reader receiver 31 has an input/output 41 connected to input/output 41 of digital modem 4. Antenna driver 32, tag emulator 33 and field power supply unit 34 all have an input/output 42 connected to input/output 42 of digital modem 4. The antenna driver 32 is a 13.56 MHz radio frequency output drive circuit, suitable for driving near field communication antenna circuits.

Digital modem 4, besides its inputs/outputs 41 and 42 already presented, also has inputs/outputs 43 and 44 to be connected to the security interface 5. Digital modem 4 has an input/output 45 to be connected to other elements not shown for clarity sake. Security interface 5 is to be connected between digital modem 4 on the one side and a SIM (Subscriber Identity Module) card or another secure element on the other side. In block 4, preferably, processor unit and control unit are associated to the digital modem 4 itself. For simplicity sake, when digital modem 4 will be mentioned hereafter, processor unit and control unit will be considered to be included too.

During performance of the built-in self-testing method, some of the functions or blocks will be used either in a reader mode or in a tag emulation mode. The reader mode corresponds to a more active mode, where it initiates the communication. The tag emulation mode corresponds to a more passive mode, where it waits for communication to be initiated by another function or block.

The reader receiver 31 is used in the tag emulation mode only. The reader receiver 31 plays the role of a load modulation demodulator. Structurally, a load modulation demodulator is an amplitude modulation demodulator. In this tag emulation mode, the reader receiver 31 receives the load modulated 13.56 MHz carrier that is load modulated by the presence of an external near field communication device working in tag emulation mode, so working itself as a load modulator. The load modulation is sensed by the antenna driver 32, and mirrored to the reader receiver 31. The reader receiver 31 demodulates the load modulated signal in order to detect the data sent, via load modulation, by the external near field communication device working in tag emulation mode.

In the reader mode of the antenna driver 32, an output drive signal, which is to be transmitted to an external near field communication device working in tag emulation mode, is amplitude modulated in response to a digital control input signal ammod, which includes data coming from the digital modem 4. Here, the antenna driver 32 plays the role of an amplitude modulation signal generator.

In the tag emulation mode of the antenna driver 32, a differential current output drive will be provided to the reader receiver 31 that is responsive to antenna load modulation effects. The load modulation is applied by an external near field communication device working in tag emulation mode on the 13.56 MHz radio frequency output magnetic field generated by the antenna driver 32. The load modulated signal is weakly amplitude modulated, about 1% modulation index, signal. Here, the antenna driver 32 plays the role of a load modulation sensor.

In the reader mode of the tag emulator 33, the tag emulator 33 receives the amplitude modulated signal from an external near field communication device working in a reader mode, and demodulates it to detect the data that have been sent by the antenna driver of this external near field communication device. Here, the tag emulator 33 plays the role of an amplitude modulated signal demodulator.

In the tag emulation mode of the tag emulator 33, the tag emulator 33 load modulates the 13.56 MHz magnetic field generated by the antenna driver of an external near field communication device working in a reader mode. Here, the tag emulator 33 plays the role of a load modulator.

In any link level testing, there is a transmitter block and a receiver block, and it is called link level because the transmitter output is connected to the receiver input and thus can establish a link. Established link respects the required protocol. Applying different protocols and data rates will allow a more exhaustive validation of the different functions. So, the different links may be tested several times to be more exhaustive.

Now the internal communication link L1 testing will be explained in more detail. In link L1, the antenna driver 32 plays the role of the transmitter, being an amplitude shift key generator, and the tag emulator 33 plays the role of the receiver, being an amplitude modulation receiver.

In more detail, the digital modem 4 generates an ammod signal to the antenna driver 32. This ammod signal which is a binary stream carries the information code of the wake up command. The antenna driver 32 includes a digital analog converter and a power amplifier. The digital analog converter of the antenna driver 32 transforms the ammod signal into an analog signal which is then amplified by the power amplifier of the antenna driver 32. This stimulus command is then output towards the tag emulator 33. The tag emulator 33 demodulates and detects this received stimulus command, which is then transmitted and analyzed in the digital modem 4.

If the internal near field communication link L1 functions properly, interrupts in the digital modem 4 are generated to indicate that the digital modem has undergone a transition, so has changed of state. So, checking whether this transition has happened or not, allows for deciding whether the link L1 testing has passed or failed. During this link L1 testing, ammod signal contains the wake up command whereas txmod signal is all zeros.

The testing coverage of testing link L1 is quite large, since it includes testing the reader modulator, the tag emulator demodulator, the reader transmitter analog frontend, the antenna if connected, some functionalities of the digital modem 4 in reader mode.

Figure 3:
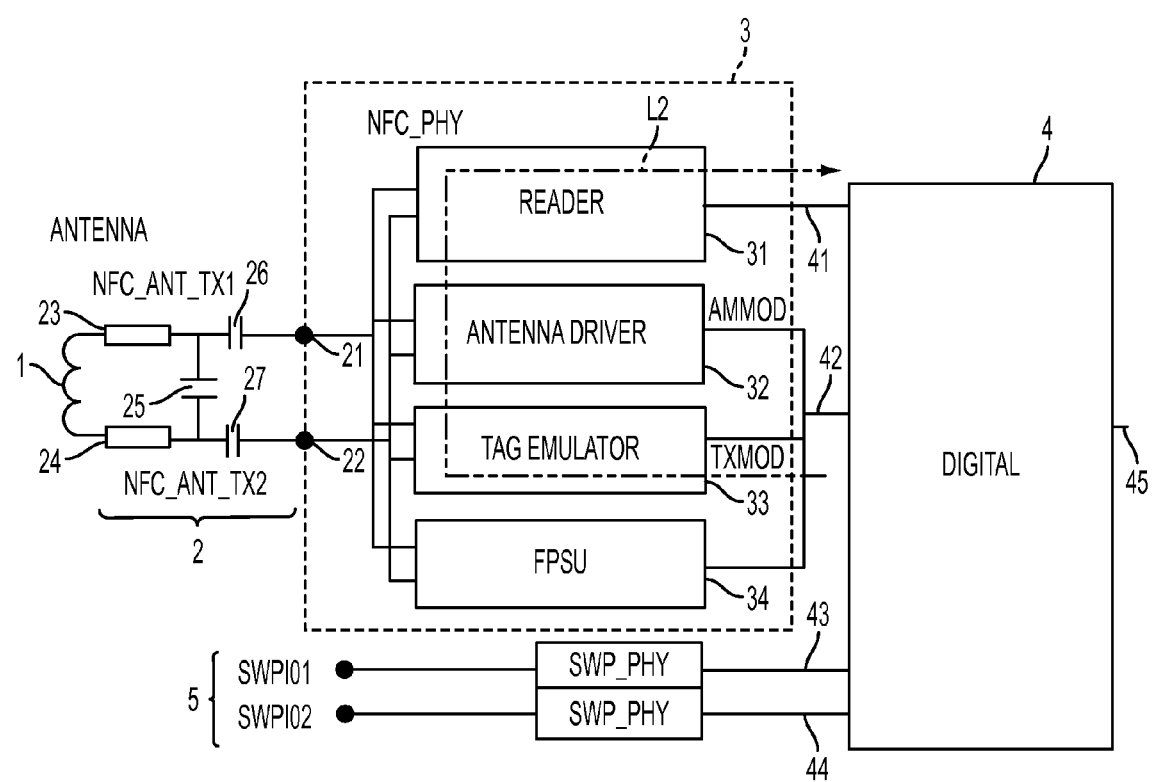
FIG. 3 shows an example of performing the test step of the built-in self-testing method, for a second internal communication link in a near field communication device according to embodiments of the invention.

FIG. 3 shows an example of performing the test step of the built-in self-testing method, for a second internal communication link in a near field communication device according to embodiments of the invention. Now the internal communication link L2 testing will be explained in more detail. Both the antenna driver 32 and the tag emulator 33 play the role of the transmitter. First, the antenna driver 32 generates a 13.56 MHz carrier signal across the antenna terminals 21 and 22, then, the load modulator of the tag emulator 33 is activated to load modulate the 13.56 MHz carrier signal generated by the antenna driver 32. The reader receiver plays the role of the receiver, being a load modulation receiver.

In more detail, the digital modem 4 generates an ammod signal to the antenna driver 32. This ammod signal which is a binary stream carries no information, it is indeed either all zeros or disabled. The digital analog converter of the antenna driver 32 transforms the not modulated ammod signal into an analog signal which is then amplified by the power amplifier of the antenna driver 32. At the output of the antenna driver, there is a not modulated carrier signal at 13.56 MHz which is sent towards the tag emulator 33.

The tag emulator 33 modulates this received not modulated carrier signal according to the information contained in the binary stream txmod. The tag emulator 33 has load modulated the carrier signal. During this link L2 testing, txmod signal contains the tag emulator response code command which is the load modulated stimulus whereas ammod signal is all zeros. The load modulation by the tag emulator 33 is performed through switching ON and OFF a supplementary resistance located in tag emulator 33 and dedicated to link testing. This supplementary resistance can range for example from 13 to 35.5 ohms. This load modulated stimulus is then demodulated in and received by the reader receiver 31. Afterwards, it is forwarded to the digital modem 4 where it is analyzed.

If the internal near field communication link L2 functions properly, interrupts in the digital modem 4 are generated to indicate that the digital modem has undergone another transition, so has changed of state again. So, checking whether this transition has happened or not, allows for deciding whether the link L2 testing has passed or failed.

The testing coverage of testing link L2 is quite large, since it includes testing the reader modulator, the tag emulator modulator, the reader receiver analog frontend, the antenna if connected, some functionalities of the digital modem 4 in reader mode and in tag emulation mode.

Figure 4:
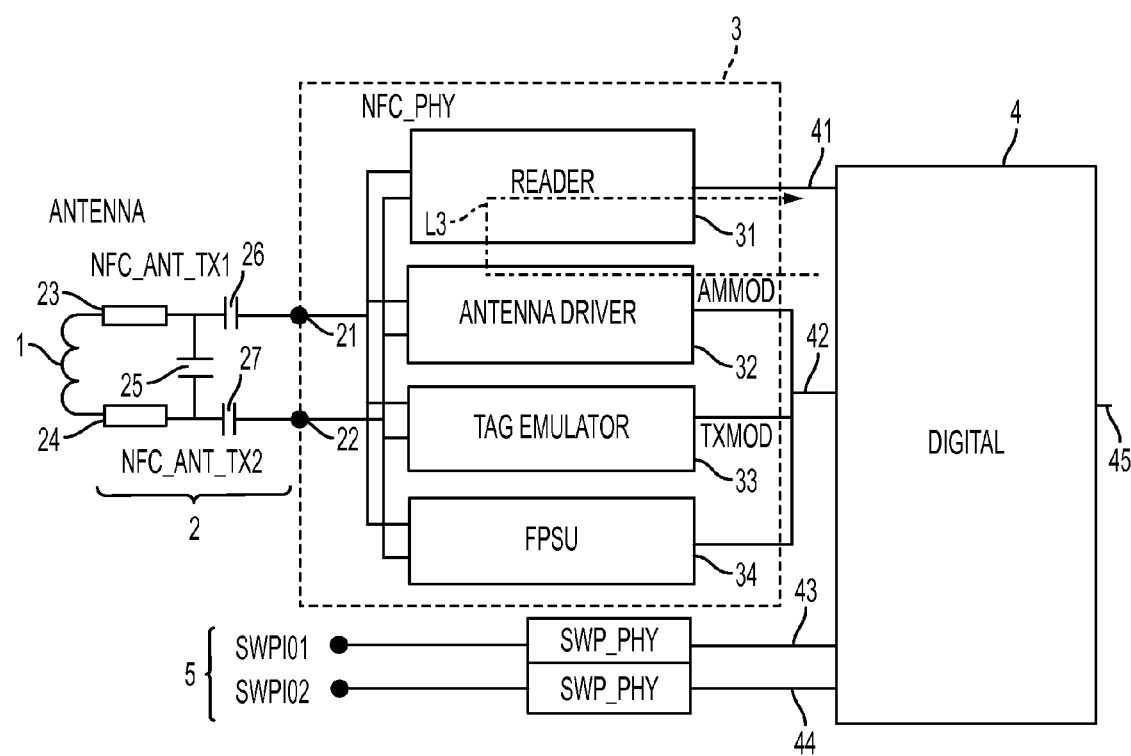
FIG. 4 shows an example of performing the test step of the built-in self-testing method, for a third internal communication link in a near field communication device according to embodiments of the invention.

FIG. 4 shows an example of performing the test step of the built-in self-testing method, for a third internal communication link in a near field communication device according to embodiments of the invention. Now the internal communication link L3 testing will be explained in more detail. In the case of link L3, the antenna driver 32 is a power amplifier generating 13.56 MHz amplitude modulated sine wave across the antenna terminals 21 and 22, so it plays the role of an amplitude modulation transmitter. The reader receiver 31 plays the role of an amplitude modulation receiver.

In more detail, the digital modem 4 generates an ammod signal to the antenna driver 32. The digital analog converter of the antenna driver 32 transforms the ammod signal into an analog signal which is then amplified by the power amplifier of the antenna driver 32. The generated ammod signal is such that one gets a load modulated signal at the output of the antenna driver 32. This load modulated signal acts as a stimulus command which is then output towards the reader receiver 31. The reader receiver 31 demodulates and detects this received stimulus command, which is then transmitted and analyzed in the digital modem 4.

If the internal near field communication link L3 functions properly, interrupts in the digital modem 4 are generated to indicate that the digital modem has undergone a new transition, so has changed of state again. So, checking whether this transition has happened or not, allows for deciding whether the link L3 testing has passed or failed. If the link L3 testing has passed, the tag emulator 33 is considered defective. If the link L3 testing has failed, the reader receiver 31 is considered defective.

In a nutshell, the proposed built-in self-testing method according to embodiments of the invention presents several advantages. First, it allows for full validation of the whole functionality of the near field communication device since it may validate the functionality of all modes of operation. Second, it allows for being applicable in both the presence and the absence of an antenna connected to the rest of the near field communication device, what increases the applicability of the proposed built-in self-testing method according to embodiments of the invention at different stages of production, for example wafer test, self-validation, production test, etc. . . . , as well as while in the field during use by a user, and all that without the need of any external equipment. Third, except for the supplementary resistance for load modulation, there is no silicon overhead circuitry, since no extra hardware is needed.

The invention has been described with reference to preferred embodiments. However, many variations are possible within the scope of the invention.

The invention claimed is:

1. A built-in self-testing method of a near field communication device including several functions, the method comprising:
   testing a first internal communication link, wherein testing the first internal communication link includes testing a reader modulator and a tag emulator of the near field communication device,
      by sending, on said first internal communication link, a first command from an antenna driver used as a transmitter to said tag emulator used as a receiver, and
      by checking that said first command has been correctly executed by said tag emulator, wherein if said first command has been correctly executed, a digital modem of the near field communication device will have undergone a change of state.

2. The built-in self-testing method according to claim 1, the method further comprising:
   testing a second internal communication link between a second function and a third function,
      by sending, on said second internal communication link, a second command from said second function used as a transmitter to said third function used as a receiver, and
      by checking that said second command has been correctly executed by said third function.

3. The built-in self-testing method according to claim 2, the method also comprising:
   testing a third internal communication link between said antenna driver and said third function,
      by sending, on said third internal communication link, a third command from said antenna driver used as a transmitter to said third function used as a receiver, and
      by checking that said third command has been correctly executed by said third function.

4. The built-in self-testing method according to claim 2, wherein said second function is a tag emulator block and wherein said third function is a reader receiver block.

5. The built-in self-testing method according to claim 2, wherein said first command is a wake up command and/or wherein said second command is a demodulation command for an amplitude modulated carrier.

6. The built-in self-testing method according to claim 1, wherein said near field communication device includes said digital modem able to undergo state transitions, either from a transmitting state to a receiving state or from the receiving state to the transmitting state,
   wherein command correct execution results indicate said digital modem undergoing one or more expected transitions, and
   wherein said checking checks whether said digital modem has undergone said expected transition(s) or not.

7. The built-in self-testing method according to claim 6, wherein said first command is initiated by said digital modem and checked at said digital modem.

8. The built-in self-testing method according to claim 1, wherein said testing is performed with and/or without an antenna connected to inputs of said antenna driver and said tag emulator.

9. A non-transitory computer readable medium storing a computer program comprising program instructions, the computer program being loadable into a data-processing unit and causing execution of the method according to claim 1 when the computer program is run by the data-processing unit.

10. A near field communication device comprising:
    several blocks; and
    a built-in self-testing system configured to test a first internal communication link between a first block and a second block among the several blocks, wherein testing the first internal communication link includes testing a reader modulator and a tag emulator of the near field communication device, by sending, on said first internal communication link, a first command from said first block, wherein said first block is an antenna driver used as a transmitter to said second block, wherein said second block is the tag emulator used as a receiver, and by checking that said first command has been correctly executed by said second block, wherein if said first command has been correctly executed, a digital modem of the near field communication device will have undergone a change of state.

11. The near field communication device according to claim 10, wherein said built-in self-testing system is also configured to test a second internal communication link between said second block and a third block among the several blocks, by sending, on said second internal communication link, a second command from said second block used as a transmitter to said third block used as a receiver, and by checking that said second command has been correctly executed by said third block.

12. The near field communication device according to claim 11, wherein said third block is a reader receiver.

13. The near field communication device according to claim 10, further including a digital modem among the several blocks, able to undergo state transitions, either from transmitting state to receiving state or from receiving state to transmitting state, wherein command correct execution results indicate said digital modem undergoing one or more expected transitions, and wherein said checking checks whether said digital modem has undergone said expected transition(s) or not.

14. The near field communication device according to claim 10, wherein said built-in self-testing system also includes an additional resistance configured to emulate a load of an antenna when no antenna is connected while said first internal communication link is tested.

* * * * *